United States Patent
Hsiao et al.

(10) Patent No.: US 11,235,290 B2
(45) Date of Patent: Feb. 1, 2022

(54) HIGH-FLUX THIN-FILM NANOCOMPOSITE REVERSE OSMOSIS MEMBRANE FOR DESALINATION

(71) Applicant: THE RESEARCH FOUNDATION FOR THE STATE UNIVERSITY OF NEW YORK, Albany, NY (US)

(72) Inventors: Benjamin S. Hsiao, Setauket, NY (US); Hongyang Ma, East Setauket, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 7 days.

(21) Appl. No.: 16/485,510

(22) PCT Filed: Feb. 14, 2018

(86) PCT No.: PCT/US2018/018101
§ 371 (c)(1),
(2) Date: Aug. 13, 2019

(87) PCT Pub. No.: WO2018/152149
PCT Pub. Date: Aug. 23, 2018

(65) Prior Publication Data
US 2020/0047131 A1    Feb. 13, 2020

Related U.S. Application Data

(60) Provisional application No. 62/460,511, filed on Feb. 17, 2017.

(51) Int. Cl.
*B01D 69/12* (2006.01)
*B01D 61/02* (2006.01)
(Continued)

(52) U.S. Cl.
CPC .......... *B01D 69/12* (2013.01); *B01D 61/025* (2013.01); *B01D 71/10* (2013.01); *C02F 1/441* (2013.01);
(Continued)

(58) Field of Classification Search
CPC .. B01D 69/12; B01D 61/025; B01D 2323/39; B01D 2323/40; B01D 67/0006;
(Continued)

(56) References Cited

U.S. PATENT DOCUMENTS 6,627,749 B1    9/2003    Kumar
7,732,427 B2    6/2010    Kiick et al.
(Continued)

FOREIGN PATENT DOCUMENTS

CN    110944682 A    3/2020
JP    2009502242 A    1/2009
(Continued)

OTHER PUBLICATIONS

International Search Report and Written Opinion of the International Searching Authority issued in corresponding Appl. No. PCT/US2018/018101 dated Apr. 9, 2018 (9 pages).
(Continued)

*Primary Examiner* — Krishnan S Menon
(74) *Attorney, Agent, or Firm* — Carter, DeLuca & Farrell LLP; Michael R. Brew

(57) ABSTRACT

Membranes are provided for use in reverse osmosis applications. Such membranes include a nanofibrous scaffold in combination with a barrier layer. The barrier layer is formed of a polymeric matrix having functionalized cellulose nanofibers incorporated therein. The membranes may, in embodiments, also include a substrate.

17 Claims, 6 Drawing Sheets

(51) Int. Cl.
  *B01D 71/10*   (2006.01)
  *C02F 1/44*    (2006.01)
  *C02F 103/08*  (2006.01)

(52) U.S. Cl.
  CPC ...... *B01D 2323/39* (2013.01); *C02F 2103/08* (2013.01); *C02F 2305/08* (2013.01)

(58) Field of Classification Search
  CPC .... B01D 69/125; B01D 69/141; B01D 71/56; B01D 71/10; C02F 1/441; C02F 2103/08; C02F 2305/08; Y02A 20/131
  See application file for complete search history.

(56) References Cited

U.S. PATENT DOCUMENTS

| | | | |
|---|---|---|---|
| 7,737,131 B2 | 6/2010 | Kiick et al. | |
| 8,101,083 B2 | 1/2012 | Ruehr et al. | |
| 8,334,121 B2 | 12/2012 | Schindler et al. | |
| 8,367,639 B2 | 2/2013 | Kiick et al. | |
| 8,415,325 B2 | 4/2013 | Kiick et al. | |
| 8,911,996 B2 | 12/2014 | Srouji et al. | |
| 9,010,547 B2 | 4/2015 | Chu et al. | |
| 9,181,636 B2 | 11/2015 | Arinzeh | |
| 10,058,822 B2 | 8/2018 | Diallo et al. | |
| 10,369,529 B2 | 8/2019 | Diallo et al. | |
| 10,532,330 B2 | 1/2020 | Diallo et al. | |
| 10,751,293 B2 | 8/2020 | Baer et al. | |
| 10,987,059 B2 | 4/2021 | Dvir et al. | |
| 11,103,617 B1 | 8/2021 | Abudula et al. | |
| 2007/0203335 A1 | 8/2007 | Huttermann et al. | |
| 2008/0149561 A1 | 6/2008 | Chu et al. | |
| 2009/0018643 A1 | 1/2009 | Hashi et al. | |
| 2009/0074832 A1 | 3/2009 | Zussman et al. | |
| 2009/0078640 A1 | 3/2009 | Chu et al. | |
| 2010/0120115 A1 | 5/2010 | Ogle et al. | |
| 2010/0143435 A1 | 6/2010 | Dagger et al. | |
| 2011/0064936 A1 | 3/2011 | Hammond-Cunningham et al. | |
| 2011/0082565 A1 | 4/2011 | Tzezana et al. | |
| 2011/0098826 A1 | 4/2011 | Mauck et al. | |
| 2011/0198282 A1 | 8/2011 | Chu et al. | |
| 2012/0265300 A1 | 10/2012 | Mauck et al. | |
| 2013/0105395 A1 | 5/2013 | Jeffrey et al. | |
| 2013/0175218 A1 | 7/2013 | Chu et al. | |
| 2013/0180917 A1 | 7/2013 | Chu et al. | |
| 2013/0266664 A1 | 10/2013 | Yang et al. | |
| 2014/0046236 A1 | 2/2014 | Filee et al. | |
| 2014/0112973 A1 | 4/2014 | Steinberg et al. | |
| 2014/0294783 A1 | 10/2014 | Wen et al. | |
| 2015/0080616 A1 | 3/2015 | Chu et al. | |
| 2015/0141711 A1 | 5/2015 | Chu et al. | |
| 2015/0290354 A1 | 10/2015 | Loboa et al. | |
| 2016/0041177 A1 | 2/2016 | Brayman et al. | |
| 2016/0263554 A1 | 9/2016 | Grubbs et al. | |
| 2016/0354729 A1 | 12/2016 | Krishna et al. | |
| 2017/0106334 A1 | 4/2017 | Chu et al. | |
| 2017/0157570 A1 | 6/2017 | Chu et al. | |
| 2017/0326486 A1 | 11/2017 | Chu et al. | |
| 2018/0243232 A1 | 8/2018 | Baer et al. | |
| 2019/0175781 A1 | 6/2019 | Pokorski et al. | |
| 2019/0193033 A1 | 6/2019 | Sahadevan et al. | |
| 2020/0047131 A1 | 2/2020 | Hsiao et al. | |
| 2020/0277711 A1 | 9/2020 | Xie | |
| 2020/0376170 A1 | 12/2020 | Ahn et al. | |
| 2021/0015961 A1 | 1/2021 | Pokorski | |

FOREIGN PATENT DOCUMENTS

| | | | | |
|---|---|---|---|---|
| JP | 2010502855 A | 1/2010 | | |
| JP | 2010530931 A | 9/2010 | | |
| JP | 5667507 B2 | 2/2015 | | |
| KR | 20060127399 A | 12/2006 | | |
| KR | 20110028019 A | 3/2011 | | |
| KR | 20120026270 A | 3/2012 | | |
| KR | 20130042854 A | 4/2013 | | |
| KR | 20150084519 A | 7/2015 | | |
| KR | 20170070008 A | 6/2017 | | |
| KR | 20180125937 A | 11/2018 | | |
| KR | 20180126436 A | 11/2018 | | |
| KR | 20210034544 A | 3/2021 | | |
| KR | 20210098031 A | 8/2021 | | |
| WO | 2006036130 A1 | 4/2006 | | |
| WO | 2008069760 A1 | 6/2008 | | |
| WO | 2008073186 A2 | 6/2008 | | |
| WO | WO-2010042647 A2 * | 4/2010 | ............... | D01F 2/24 |
| WO | 2010141718 A1 | 12/2010 | | |
| WO | 2014195971 A1 | 12/2014 | | |
| WO | 2020218302 A1 | 10/2020 | | |
| WO | 2021087613 A1 | 5/2021 | | |

OTHER PUBLICATIONS

First Examination Report issued in corresponding Indian Appl. No. 201927033124 dated Mar. 23, 2021 (6 pages).

* cited by examiner

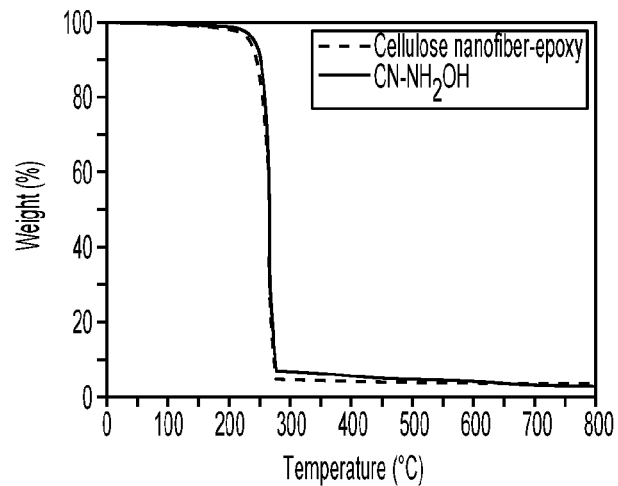
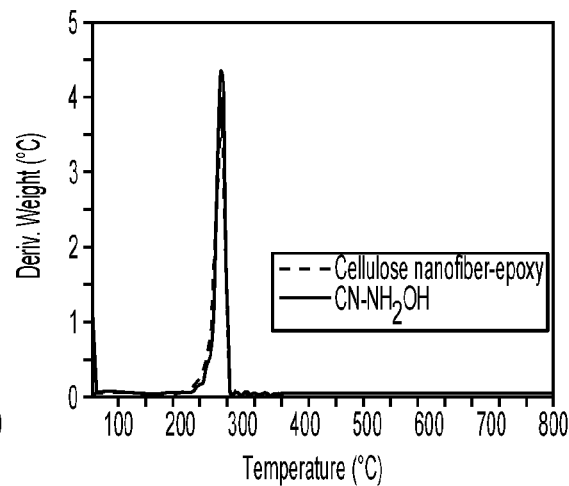
FIG. 7A          FIG. 7B
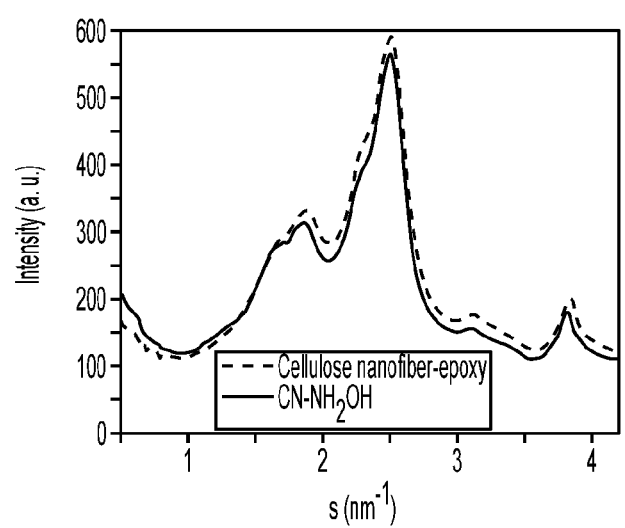
FIG. 8

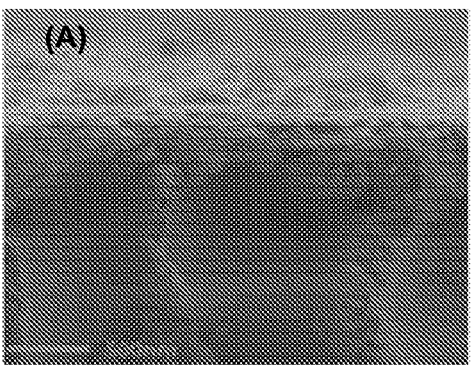
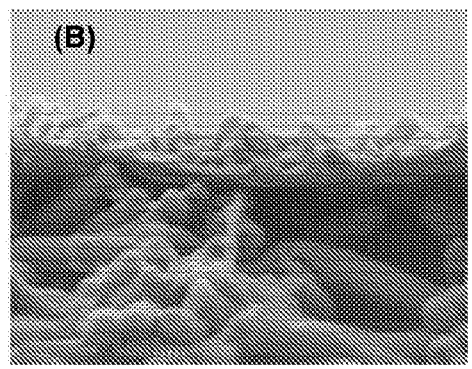
FIG. 9A  FIG. 9B
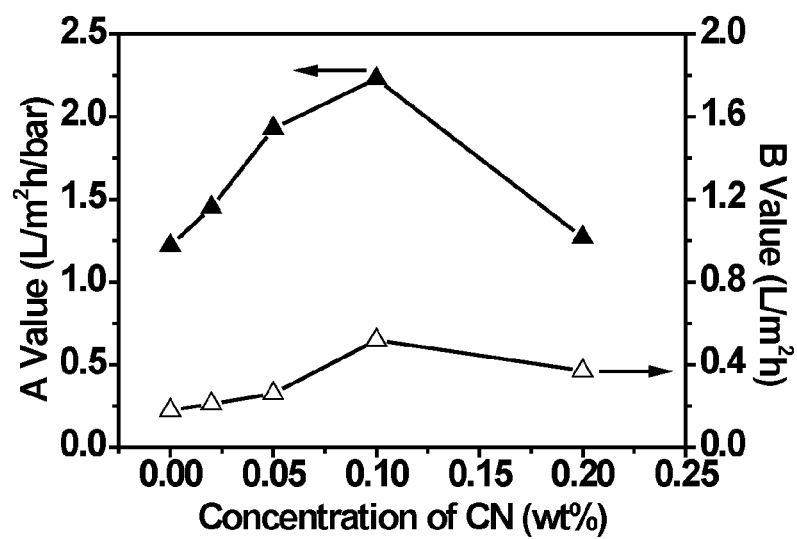
FIG. 10

HIGH-FLUX THIN-FILM NANOCOMPOSITE REVERSE OSMOSIS MEMBRANE FOR DESALINATION

CROSS REFERENCE TO RELATED APPLICATIONS

This application is a National Stage of, and claims priority to and the benefit of, International Patent Application No. PCT/US2018/018101 filed on Feb. 14, 2018, which, in turn claims the benefit of, and priority to, U.S. Provisional Patent Application Ser. No. 62/460,511, filed Feb. 17, 2017, the entire disclosure of which is incorporated by reference herein.

GOVERNMENT RIGHTS

This invention was made with government support under grant number DMR-1409507 awarded by the National Science Foundation. The government has certain rights in the invention.

BACKGROUND

Reverse osmosis (RO) is one of the most energy efficient separation technologies to remove salt ions from brackish water or seawater. Conventional RO membranes possess a thin-film composite (TFC) structure, containing an ultra-thin barrier layer supported by a porous polymeric substrate that can be used directly as an ultrafiltration (UF) medium. Nanofillers may be incorporated into the polyamide barrier layer to improve either the permeability or separation efficiency. Examples of nanofillers include zeolites, silica, silver, alumina, reduced graphene oxide/$TiO_2$, graphene oxide and carbon nanotubes.

Improved membranes for reverse osmosis applications, as well as methods for their manufacture and use, remain desirable.

SUMMARY

In accordance with the present disclosure, high flux, thin-film composite membranes, based on a nanocomposite barrier layer containing cellulose nanofibers and polyamide matrix, supported by a conventional ultrafiltration (UF) substrate, have been demonstrated for two reverse osmosis applications (i.e., low pressure desalination of brackish water and high pressure desalination of seawater). In some embodiments, the cellulose nanofibers (CN) may be: 2,3-dialdehyde cellulose nanofibers, alkyl diol/alkyl diamine (where alkyl could be methyl, ethyl, propyl, butyl, etc.) functionalized cellulose nanofibers, and hydroxylamine functionalized cellulose nanofibers, having fiber cross-sectional width of about 5 nm. In embodiments, these nanofibers may be incorporated in the barrier layer of the membrane by interfacial polymerization. The resulting CN-TFC membranes exhibited significantly higher permeation flux while being able to maintain high salt rejection capability. In embodiments, the CN-TFC membranes exhibited up to several times higher permeation flux than a pristine TFC membrane for desalination of brackish water, and higher permeation flux than commercial membranes for desalination of seawater, without sacrificing of the salt rejection ratio.

In embodiments, an article of the present disclosure includes a nanofibrous scaffold having pores of a diameter from about 0.01 µm to about 10 µm; and a barrier layer on at least a portion of a surface of said nanofibrous scaffold, the barrier layer including a polymer matrix in combination with functionalized cellulose nanofibers.

In embodiments, the nanofibrous scaffold includes a polymer such as polysulfones, polyolefins, fluoropolymers, polyesters, polyamides, polycarbonates, polystyrenes, polynitriles, polyacrylates, polyacetates, polyalcohols, polysaccharides, proteins, polyalkylene oxides, polyurethanes, polyureas, polyimines, polyacrylic acids, polymethacrylic acids, polysiloxanes, poly(ester-co-glycol) copolymers, poly(ether-co-amide) copolymers, derivatives thereof and copolymers thereof.

In some embodiments, the nanofibrous scaffold has a thickness of from about 1 µm to about 500 µm.

In embodiments, the polymer matrix is a polyamide, polyimides, polyesters, polyurethanes, polysulfone and polyethersulfone derivatives, cellulose acetate, cellulose triacetate, polyurethane copolymers, polyurea copolymers, polyether-b-polyamide, PEG modified fluorinated copolymers, ethylene-propylene copolymers, cellulose based copolymers, ethylene based copolymers, propylene based copolymers, derivatives thereof, and combinations thereof, and the barrier layer has a thickness from about 5 nm to about 500 nm.

In some embodiments, the functionalized cellulose nanofiber includes carboxylate-functionalized nanocelluloses, aldehyde-functionalized nanocelluloses, hydroxyl-functionalized nanocelluloses, hydroxylamino-functionalized nanocelluloses, amino-functionalized nanocelluloses, and combinations thereof.

In embodiments, the functionalized cellulose nanofiber is present in the barrier layer in amounts from about 0.01% by weight to about 50% by weight of the barrier layer.

In some embodiments, articles of the present disclosure also include a substrate, wherein the nanofibrous scaffold is applied to at least a portion of the substrate. The substrate may be a polymer such as polysulfones, polyolefins, polyesters, polyamides, polyurethanes, polyureas, fluorinated polymers, derivatives thereof and copolymers thereof. In other embodiments, the substrate may be cellulose acetates, fluoropolymers, polyamides, polyimides, and combinations thereof. The substrate may have a pore size of from about 5 nm to about 500 nm.

In other embodiments, an article of the present disclosure includes a substrate; a nanofibrous scaffold having pores of a diameter from about 0.01 µm to about 10 µm; and a barrier layer on at least a portion of a surface of said nanofibrous scaffold, the barrier layer including a polymer matrix in combination with functionalized cellulose nanofibers.

Methods for conducting reverse osmosis by contacting water with these articles, are also provided.

BRIEF DESCRIPTION OF THE DRAWINGS

Various embodiments of the presently disclosed membranes and methods are described herein with reference to the drawings wherein:

FIGS. 7A-7B are thermogravimetric analysis (TGA) curves of hydroxylamino- and epoxy-functionalized cellulose nanofibers (FIG. 7A) and their differential curves (FIG. 7B);

FIG. 8 is a graph depicting 2-dimensionalprofiles of hydroxylamino- and epoxy-functionalized cellulose nanofibers obtained by Wide angle X-ray diffraction (WAXD);

FIGS. 9A-9B are scanning electron microscope (SEM) cross-sectional images of a pristine TFC membrane on polyacrylonitrile (PAN) 400 (FIG. 9A) and a TFC membrane containing CN—COONa on electrospun nanofibrous scaffold (FIG. 9B);

FIG. 10 is a graph showing filtration performance of the CN-TFC membranes as a function of the CN—COONa loading (in weight %)

DETAILED DESCRIPTION

Figure 1:
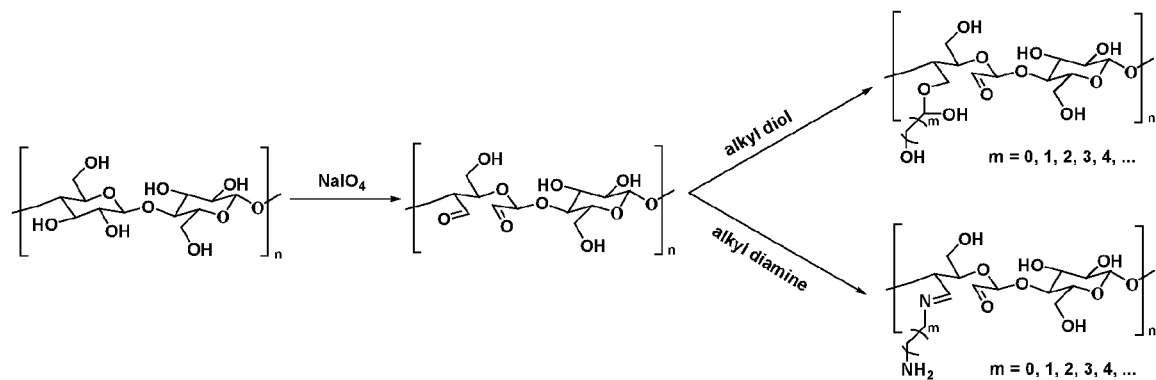
FIG. 1 depicts the reaction scheme by which aldehyde-functionalized cellulose nanofibers (CN—CHO), alkyl alcohol-functionalized cellulose nanofibers, and alkyl amino-functionalized cellulose nanofibers were prepared in accordance with the present disclosure.

The present disclosure provides a novel membrane for reverse osmosis (RO), based on the combination of an electrospun nanofibrous scaffold and a barrier layer. The RO membranes of the present disclosure may be utilized with any system capable of carrying out reverse osmosis. In embodiments, the RO membranes of the present disclosure may be used for purification of brackish water, as well as the desalination of seawater.

In RO or nanofiltration (NF) membranes, the barrier layer is an important component for separation. The traditional barrier layer in a RO membrane includes tightly cross-linked polymer chains. The resultant barrier matrix thus possesses torturous pathways, which are often described by the free volume concept, and result in a high hydraulic resistance and low permeability. To increase permeability, embodiments disclosed herein incorporate directed water channels in the barrier layer. Water channels are formed as the natural occurrence of the interface between the surface of imbedded nanofibers and cross-linked polymer chains. While not being bound by a particular theory, it is believed that the presence of directed water channels can reduce the passage length of water transport through the polymer matrix and thus increase the permeate flux of the membrane. In addition, the selectivity, which should be dependent on the interface gap width, may be fine-tuned by the surface chemistry of the embedded nanofibers during interfacial polymerization.

The membranes of the present disclosure include a composite structure with multiple layers. One layer includes a non-woven nanofibrous scaffold. In some embodiments, the scaffold layer includes electrospun nanofibers. A second layer is a barrier layer. In accordance with the present disclosure nanofibrous membranes are enhanced for reverse osmosis applications. In some embodiments, the nanofibrous scaffold may be applied to a base layer, sometimes referred to herein, in embodiments, as a "substrate."

Electrospun nanofibrous scaffolds have high porosity (up to about 80% and, in some cases, greater than about 80%), high surface to volume ratio of the material from about 4 m$^2$/g to about 40 m$^2$/g in embodiments from about 8 m$^2$/g to about 20 m$^2$/g, with fibers having diameters from about 100 nm to about 200 nm. Electrospun nanofibrous scaffolds can be used as a supporting layer in forming thin-film composite (TFC) reverse osmosis membranes of the present disclosure. These membranes possess very high permeation flux from about 1 L/m$^2$ h to about 1000 L/m$^2$ h, in embodiments from about 10 L/m$^2$ h to about 100 L/m$^2$ h (increased by a factor of from about 1 to about 10 when compared with typically commercial membranes), and a high rejection rate, in embodiments from about 90% to about 100%, in other embodiments from about 95% to about 99.5%.

These scaffolds may be made of suitable polymers within the purview of one skilled in the art, including, but not limited to, polyolefins including polyethylene and polypropylene, polysulfones such as polyethersulfone, fluoropolymers such as polyvinylidene fluoride, polyesters including polyethylene terephthalate, polytrimethylene terephthalate, and polybutylene terephthalate, polyamides including nylon 6, nylon 66, and nylon 12, polycarbonates, polystyrenes, polynitriles such as polyacrylonitrile, polyacrylates such as polymethyl methacrylate, polyacetates such as polyvinyl acetate, polyalcohols such as polyvinyl alcohol, polysaccharides (such as chitosan, cellulose, collagen, or gelatin), proteins such as chitin, hyaluronic acid, polyalkylene oxides such as polyethylene oxide and polyethylene glycol, polyurethanes, polyureas, polyvinyl chloride, polyimines such as polyethylene imine, polyvinylpyrrolidone, polyacrylic acids, polymethacrylic acids, polysiloxanes such as polydimethylsiloxane, poly(ester-co-glycol) copolymers, poly(ether-co-amide) copolymers, crosslinked forms thereof, derivatives thereof and copolymers thereof. In some embodiments, polysulfones, poly(acrylonitrile) (PAN), polyethersulfone (PES), polyvinylidenefluoride (PVDF), crosslinked water soluble polymers, e.g., polyvinylalcohol (PVA), modified cellulose and modified chitosan, their chemical derivatives and/or copolymers, may be utilized. Combinations of the foregoing may also be used to form suitable scaffolds.

In some embodiments, it may be desirable to crosslink fluid-soluble polymers to form a nanofibrous scaffold. For example, water-soluble polymers, such as polyvinyl alcohol, polysaccharides (including chitosan and hyaluronan), polyalkylene oxides (including polyethylene oxide), gelatin, and their derivatives may be crosslinked to render these polymers suitable for use as a hydrophilic nanofibrous scaffold. Crosslinking may be conducted using methods within the purview of those skilled in the art, including the use of crosslinking agents. Suitable crosslinking agents include, but are not limited to, C$_2$-C$_8$ dialdehyde, C$_2$-C$_8$ diepoxy, C$_2$-C$_8$ monoaldehydes having an acid functionality, C$_2$-C$_9$ polycarboxylic acids, combinations thereof, and the like. These compounds are capable of reacting with at least two hydroxyl groups of a water-soluble polymer.

Other suitable crosslinking methods include conventional thermal-, radiation- and photo-crosslinking reactions within the purview of those skilled in the art. Two important criteria for the selection of a crosslinking agent or method are as follows: (1) the crosslinking agent or method should not dissolve the nanofibrous scaffold layer, and (2) the crosslinking agent or method should not induce large dimensional change, e.g., hydrophilic electrospun nanofibrous scaffold layers may display very large shrinkage in hydrophobic solvents such as hydrocarbons because of their hydrophilic nature.

Specific examples of crosslinking agents which may be utilized include, but are not limited to, glutaraldehyde, 1,4-butanediol diglycidyl ether, glyoxal, formaldehyde, glyoxylic acid, oxydisuccinic acid, citric acid, fumaric acid, combinations thereof, and the like. In some embodiments, it may be useful to treat polyvinyl alcohol with a crosslinking agent such as glutaraldehyde.

The amount of crosslinking agent added to the water-soluble polymer, such as polyvinyl alcohol, may vary from about 0.1 to about 50 percent by weight of the combined weight of the crosslinking agent and polymer, in embodiments from about 0.5 to about 5 percent by weight of the combined weight of the crosslinking agent and polymer.

The thickness of the nanofibrous scaffold may vary from about 1 µm to about 500 µm, in embodiments from about 10 µm to about 300 µm, in embodiments from about 30 µm to about 150 µm in thickness. In some embodiments, the thickness of the scaffold is from about 40 µm to about 50 µm.

The nanofibrous scaffold possesses pores or voids which assist in the functioning of the membranes of the present disclosure. The diameter of these voids may be from about 0.01 µm to about 10 µm, in embodiments from about 0.05 µm to about 5 µm, in embodiments from about 0.1 µm to about 1 µm.

In forming the nanofibrous scaffold of the present disclosure, the polymer is often first placed in a solvent, such as N,N-dimethyl formamide (DMF), tetrahydrofuran (THF), methylene chloride, dioxane, ethanol, propanol, butanol, chloroform, water, or combinations of these solvents, so that the polymer is present at an amount from about 1 to about 40 percent by weight of the polymer solution, in embodiments from about 3 to about 25 percent by weight of the polymer solution, in embodiments from about 5 to about 15 percent by weight of the polymer solution.

In some embodiments, it may be desirable to add a surfactant or another solvent-miscible liquid to the polymer solution utilized to form the nanofibrous scaffold. The surfactant or other solvent-miscible liquid may lower the surface tension of the solution, which may help stabilize the polymer solution during electro-spinning, electro-blowing, and the like. Suitable surfactants include, for example, octylphenoxypolyethoxy ethanol (commercially available as TRITON X-100), sorbitan monolaurate, sorbitan sesquioleate, glycerol monostearate, polyoxyethylene, polyoxyethylene cetyl ether, dimethyl alkyl amines, methyl dialkyl amines, combinations thereof, and the like. Where utilized, the surfactant may be present in an amount from about 0.001 to about 10 percent by weight of the polymer solution, in embodiments from about 0.05 to about 5 percent by weight of the polymer solution, in embodiments from about 0.1 to about 2 percent by weight of the polymer solution. The solvent miscible fluid with the solvent forms a solvent mixture that can dissolve the polymer but changes the surface tension of the polymer solution and the evaporation rate of the solvent mixture.

In embodiments, the nanofibrous scaffold may be fabricated using electro-spinning, electro-blowing, blowing-assisted electro-spinning, and/or solution blowing technologies. Electro-spinning processes use mainly electric force, but often without the assistance of gas flow. To the contrary, solution blowing processes use only gas flow, without the use of electric force. Blowing-assisted electro-spinning and electro-blowing both use electric force and gas-blowing shear forces. In blowing-assisted electro-spinning processes, the electric force is the dominating factor, while the gas-blowing feature can assist in shearing the fluid jet stream and in controlling the evaporation of the solvent (lower throughput, smaller diameter). In contrast, in electro-blowing processes the gas-blowing force is the dominating factor to achieve the desired spin-draw ratio, while the electric force may enable further elongation of fibers (higher throughput, larger diameter).

As noted above, in embodiments, a membrane of the present disclosure includes a barrier layer applied to the nanofibrous scaffold. Suitable materials for forming the barrier layer include, in embodiments, polyamides, polysaccharides such as chitosan and cellulose, polyalcohols including crosslinked PVA, polyalkylene oxides including crosslinked polyethylene oxide (PEO), their derivatives and combinations thereof. In embodiments, the barrier layer includes a polymeric matrix with functionalized cellulose nanofibers incorporated therein. The barrier layer may have a thickness from about 5 nm to about 500 nm, in embodiments from about 10 nm to about 200 nm, in embodiments from about 50 nm to about 100 nm.

In embodiments, the barrier layer contains functionalized cellulose nanofibers therein. These cellulose nanofibers (CN) have a diameter of from about 2 nm to about 50 nm, in embodiments from about 4 nm to about 20 nm, in embodiments about 5 nm, and a length of from about 100 nm to about 5000 nm, in embodiments from about 200 nm to about 1000 nm, in embodiments from about 300 to about 800 nm.

Cellulose nanofibers can be prepared according to the procedure described in WO2010/042647, the disclosure of which is incorporated by reference herein in its entirety. For example, in embodiments, suitable oxidation procedures to generate nanofibers, in embodiments, polysaccharide nanofibers, include the following. In embodiments, a 2,2,6,6-tetramethylpiperidine-1-oxyl (TEMPO)/NaBr/NaClO oxidation system may be used to generate carboxylate groups on the surface of the cellulose nanofibers. For example, the $C_6$-hydroxyl group is oxidized to a certain degree with this oxidation system. After oxidation, both carboxylate and aldehyde groups may be produced, in addition to the original hydroxyl groups. After mild mechanical treatment (e.g., stirring or mixing with a homogenizer at a speed of 5000 rpm), cellulose nanofibers having a large number of carboxylate groups are produced.

In accordance with the present disclosure, these cellulose nanofibers may be used as is in forming a barrier layer of a membrane of the present disclosure, or additional functional groups may be introduced onto the cellulose nanofibers. For example, in embodiments, the functionalized cellulose nanofibers may be carboxylate-functionalized nanocelluloses (CN—COONa) having a negatively charged surface that does not partake in interfacial polymerization; aldehyde-functionalized nanocelluloses (CN—CHO) having electrical neutrality that do not react in the polymerization process; hydroxyl-functionalized nanocelluloses (CN—OH) which might partially participate in interfacial polymerization; hydroxylamino-functionalized nanocelluloses (CN—NH$_2$OH) with positively charged surfaces that could participate in interfacial polymerization; and/or amino-functionalized nanocelluloses (CN—NH$_2$) with positively charged surfaces that could participate in interfacial polymerization.

Methods for generating these additional functional groups on the cellulose nanofibers are within the purview of those skilled in the art.

Aldehyde-functionalized cellulose nanofibers (CN—CHO), alkyl alcohol-functionalized cellulose nanofibers, and alkylamino-functionalized cellulose nanofibers may be prepared by oxidation of cellulose with sodium periodate, followed by grafting of alkyl diol or alkyl diamine (where alkyl is methyl, ethyl, propyl, butyl, etc.) onto the surface of 2,3-dialdehyde cellulose nanofibers (CN—CHO) in an aqueous media (the reactions are illustrated in FIG. 1). The grafting reaction may be carried out at room temperature. An excess amount of alkyl diol and alkyl diamine may be used to avoid the side reaction of cross-linking between cellulose nanofibers and diol/diamine molecules.

For example, 2,3-dialdehyde cellulose nanofibers (CN—CHO) may be prepared by dispersing dry wood pulp and sodium periodate in water. The mixture may be stirred for a suitable period of time at room temperature while covered to avoid light. The reaction may be terminated by adding glycol followed by stirring. The oxidized cellulose product may be separated by centrifugation and washed with deionized (DI) water.

In some cases, these CN—CHO nanofibers may be further modified to prepare alkyl alcohol-functionalized CN (CN—OH) nanofibers, where alkyl could be methyl, ethyl, propyl, butyl, etc. As an example, glycol may be added to the CN—CHO suspension, followed by continuously stirring at room temperature for a suitable period of time.

In other embodiments, the CN—CHO nanofibers may be modified to prepare alkylamino-functionalized CN (CN—NH$_2$) nanofibers, following a similar procedure.

Carboxylated cellulose nanofibers (CN—COONa) may be prepared by dispersing dry wood pulp cellulose in water. Sodium bromide and TEMPO agent are then dissolved in the suspension. The reaction is initiated by adding NaClO aqueous solution. The mixture may be stirred for a suitable period of time at room temperature with the pH value maintained from about 9 to about 11 (adjusted using sodium hydroxide aqueous solution). The reaction is terminated by adding ethanol followed by stirring. The oxidized cellulose product is separated using centrifugation and subsequently washed with deionized (DI) water. This process may be was repeated several times until the pH value is close to neutral.

Figure 5:
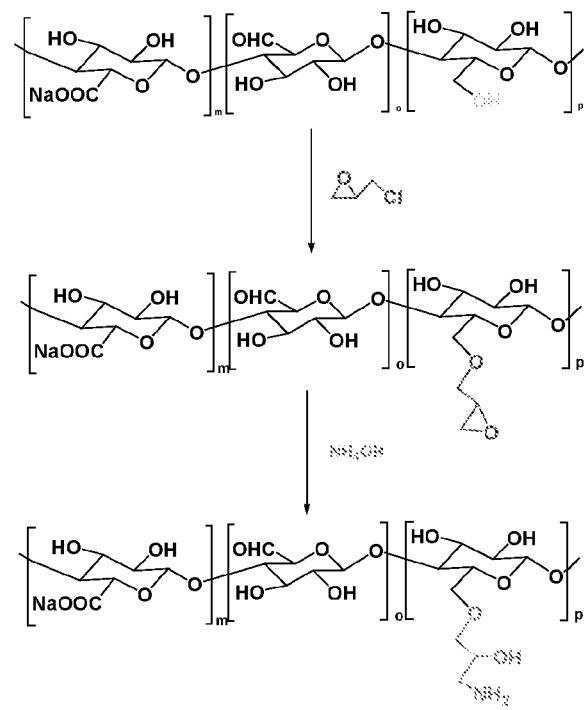
FIG. 5 depicts the reaction scheme by which hydroxylamino-functionalized cellulose nanofibers (CN—NH$_2$OH) are fabricated from carboxylate cellulose nanofibers (CN—COONa)

The carboxylated CN—COONa nanofibers may then be further modified to prepare hydroxyamino-functionalized CN (CN—NH$_2$OH) nanofibers. For example, hydroxylamino-functionalized cellulose nanofibers (CN—NH$_2$OH) may be fabricated from carboxylated cellulose nanofibers (CN—COONa) following a two-step-modification: (1) epichlorohydrin is reacted with hydroxyl groups in cellulose nanofibers first, (2) followed by grafting with hydroxylamine, as shown in FIG. 5. Carboxylate groups co-existed on the surface of modified cellulose nanofibers; therefore, the hydroxylamino-functionalized cellulose nanofibers could be dispersed in water after modification. In more detail, the oxidized cellulose slurry is diluted with water. Epichlorohydrin is added to the suspension followed by addition of a NaOH aqueous solution. The reaction system is stirred at room temperature for a suitable period of time. The resulting suspension is subsequently centrifuged and washed using DI water until the conductivity remained unchanged.

The final suspension, an epoxy-grafted cellulose slurry, may be further modified with hydroxylamine. The epoxy grafted cellulose slurry is mixed with water and ammonium hydroxide, while tuning the pH value to about 12.0 with a sodium hydroxide aqueous solution. The reaction system is stirred at a suitable temperature, in embodiments about 60° C., for a suitable period of time, in embodiments about 24 hours. The final hydroxylamine-grafted cellulose slurry is washed with DI water several times until the pH value of the suspension is around neutral. The hydroxyamino-functionalized CN (CN—NH$_2$) suspension may be homogenized for a suitable period of time.

As noted above, the functionalized cellulose nanofibers are incorporated into a polymeric matrix to form a barrier layer on the reverse osmosis membrane of the present disclosure. Suitable polymers for use in forming the polymeric matrix of the barrier layer include, in some embodiments, polyamides, polyimides, polyesters, polyurethanes, polysulfone and polyethersulfone derivatives, cellulose acetate, cellulose triacetate, combinations thereof, and the like. In some embodiments, a suitable polymer matrix may include hydrophobic/hydrophilic copolymers. Such copolymers include, but are not limited to, polyurethane copolymers, polyurea copolymers, polyether-b-polyamide, PEG modified fluorinated copolymers, ethylene-propylene copolymers, cellulose based copolymers, ethylene based copolymers, propylene based copolymers, combinations thereof, and the like.

In embodiments, the functionalized cellulose nanofibers may be incorporated into the polymeric matrix by simple mixing or blending. In other embodiments, the polymeric matrix may be formed by interfacial polymerization, in which the functionalized cellulose nanofibers are combined with the monomers used to produce the polymer matrix at the time of formation.

Methods for conducting interfacial polymerization are generally within the purview of those skilled in the art. In embodiments, the barrier layer is a polyamide prepared by interfacial polymerization (thru condensation polymerization) of two immiscible reactive solutions, where the monomers are m-phenylenediamine (MPD, in the aqueous phase) and trimesoyl chloride (TMC, in the organic phase). The procedure is generally as follows. The reactive aqueous phase is prepared by dissolving a proper amount of MPD in deionized water and then by adding the functionalized cellulose nanofibers to form a homogenous suspension. The reactive organic phase is prepared by dissolving a proper amount of TMC in n-hexane. The fibrous support, in embodiments a polysulfone UF scaffold, is immersed in an MPD aqueous solution without cellulose nanofibers for a suitable time, followed by removal of the excess MPD solution. The aqueous suspension, containing the MPD and the functionalized cellulose nanofibers (i.e., CN—COONa, CN—NH$_2$OH, CN—OH, CN—CHO, or CN—NH$_2$), is then introduced on the UF nanofibrous scaffold surface by any suitable process, for example, cast-coating. The TMC/n-hexane solution is then coated on top of the saturated UF scaffold and the reaction is allowed to take place for a suitable time, in embodiments from about 1 minute to about 20 minutes, in embodiments about 2 minutes. The excess organic solution is subsequently drained and the resulting membrane is cured in an oven at a suitable temperature, in embodiments from about 50° C. to about 120° C., in embodiments from about 60° C. to about 90° C., in embodiments about 70° C., for a period of from about 5 minutes to about 30 minutes, in embodiments from about 8 minutes to about 20 minutes, in embodiments about 10 minutes.

While the above description of the interfacial polymerization process describes the use of MPD and TMC, it is to be appreciated that other suitable reactive monomers may be used. Such monomers include, for example, methyl-, bromo-, chloro-, carboxyl, hydroxyl-substituted MPD, 1,3,5-triaminobenzene, chloride terminated molecules including mm-biphenyl tetraacyl chloride (mm-BTEC), om-biphenyltetraacyl chloride (om-BTEC), op-biphenyl tetraacyl chloride (op-BTEC), and isophthaloyl chloride (IPCP), along with their amine terminated molecules; piperazine (PIP), p-phenylenediamine (PPD), and o-phenylenediamine (OPD).

In embodiments, the resulting polymer matrix for the barrier layer is a cross-linked polyamide prepared by interfacial polymerization, where directed water channels with 1 nm-size are created between the surface of the cellulose nanofibers and the polyamide matrix. The functionalized cellulose nanofibers in the barrier layer may be used to adjust the size of the gap between the surface of the nanofiber and the polyamide matrix formed during an interfacial polymerization process. The use of these functionalized cellulose nanofibers in the barrier layer creates directed water channels to increase the permeation flux of water, and also permits one to control the size of the channels, thereby selectively passing water molecules while retaining sodium or chloride ions. As a result, sodium chloride could be removed by the barrier layer from seawater for desalination.

In embodiments, the functionalized cellulose nanofibers are incorporated into the barrier layer of thin-film composite membranes of the present disclosure where a porous polysulfone membrane was employed as a nanofibrous scaffold.

In embodiments, the functionalized cellulose nanofiber may be present in the barrier layer in amounts from about 0.01% by weight to about 50% by weight of the barrier layer, in embodiments from about 0.05% by weight to about 10% by weight of the barrier layer, in embodiments from about 0.5% by weight to about 2% by weight of the barrier layer.

In embodiments, in addition to the nanofibrous scaffold and barrier layer described above, membranes of the present disclosure may also include any substrate currently in use with reverse osmosis membranes.

Such substrates include, but are not limited to, hydrophilic polymers, hydrophobic polymers, hydrophilic/hydrophobic copolymers, polyelectrolytes, and ion-containing polymers. Specific examples of polymers which may be utilized include, but are not limited to, polyolefins including polyethylene and polypropylene, polyesters including polyethylene terephthalate, polytrimethylene terephthalate and polybutylene terephthalate, polyamides including nylon 6, nylon 66, and nylon 12, polyurethanes, fluorinated polymers, polyetherketones, polystyrene, sulfonated polyetherketones, sulfonated polystyrene and derivatives thereof, cellulose and derivatives thereof, and copolymers thereof. In some embodiments, commercially available non-woven substrates made of polyethylene terephthalate (PET), propylene, including isotactic polypropylene (iPP), polyethylene (PE), glass, cellulose and cellulose-based polymers, and fluorinated polymers, may be used as the substrate.

In some embodiments, suitable substrates may include hydrophobic/hydrophilic copolymers. Such copolymers include, but are not limited to, polyurethane copolymers, polyurea copolymers, polyether-b-polyamide, PEG modified fluorinated copolymers, ethylene-propylene copolymers, cellulose based copolymers, ethylene based copolymers, propylene based copolymers, combinations thereof, and the like. These copolymers, which possess excellent mechanical strength and durability, may be useful where such characteristics are desired for the membrane.

Other suitable substrates may be porous membranes, including those fabricated by a phase inversion method. Phase inversion methods are within the purview of those skilled in the art and generally include: (1) casting a solution or mixture possessing high molecular weight polymer(s), solvent(s), and nonsolvent(s) into thin films, tubes, or hollow fibers; and (2) precipitating the polymer. The polymer may be precipitated, in embodiments, by: evaporating the solvent and nonsolvent (dry process); exposing the material to a nonsolvent vapor (e.g. water vapor), which absorbs on the exposed surface (vapor phase-induced precipitation process); quenching in a nonsolvent liquid, generally water (wet process); or thermally quenching a hot film so that the solubility of the polymer is greatly reduced (thermal process).

Suitable porous substrates, including those prepared by phase inversion processes, are within the purview of those skilled in the art and include, for example, substrates produced from polymers such as polysulfones (e.g. polyethersulfone), cellulose acetates, fluoropolymers (e.g. polyvinylidene fluoride (PVDF) and polyoxyethylene methacrylate (POEM) grafted PVDF), polyamides (e.g. poly-ether-b-polyamide), and polyimides. Such substrates may have a pore size of from about 5 nm to about 500 nm, in embodiments, from about 20 nm to about 100 nm.

In some embodiments, non-woven poly(ethylene terephthalate) (PET) micro membranes (commercially available as AWA16-1 from SANKO LIMITED, 1316-1 Kawamukocho, Tsuzuki-ku, Yokohama, 224-0044 Japan, with an average fiber diameter of about 20 µm) can be used as the substrate. In other embodiments, non-woven PET micro filters (commercially available as NOVATEXX 2413 from Freudenberg Filtration Technologies KG, D-69465 Weinheim, Germany), with an average fiber diameter of 20 µm, can be used as the substrate.

In embodiments, the nanofibrous scaffold layer of the membrane, such as a polysulfone or polyethersulfone (PES), may be electrospun on a substrate, such as a non-woven polyethylene terephthalate (PET) micro-filter (AWA16-1 from SANKO LIMITED, 1316-1 Kawamukocho, Tsuzuki-ku, Yokohama, 224-0044 Japan), utilizing methods within the purview of those skilled in the art.

Where a membrane of the present disclosure possesses multiple layers, the substrate may be used to form a bottom layer having a thickness from about 1 µm to about 300 µm, in embodiments from about 10 µm to about 200 µm, in embodiments from about 50 µm to about 150 µm in thickness; the electrospun nanofibers may form a middle layer having a thickness from about 1 µm to about 500 µm, in embodiments from about 10 µm to about 300 µm, in embodiments from about 30 µm to about 150 µm in thickness, in other embodiments from about 40 µm to about 50 µm; and the top barrier layer having the functionalized cellulose nanofibers in a polymer matrix may have a thickness from about 5 nm to about 500 nm, in embodiments from about 10 nm to about 200 nm, in embodiments from about 50 nm to about 100 nm.

In embodiments, the reverse osmosis membrane of the present disclosure may have a 3-tier structure, where the bottom layer is a PET non-woven mat, the middle layer is a porous structure with ultrafiltration-sized pores, and the top layer is a non-porous barrier layer fabricated by interfacial polymerization. The modified cellulose nanofibers are introduced by dispersing in the aqueous phase during synthesis of the barrier layer and synergistically react with monomers used in the fabrication of the barrier layer.

Based on the unique TFC membrane structure, the present disclosure provides a new class of reverse osmosis membranes that have both a high flux and a high separation factor.

In accordance with the present disclosure, thin-film composite (TFC) membranes, based on an electrospun nanofibrous scaffold with fiber diameter of 100-200 nm (instead of a UF substrate made by phase inversion) and a nanocomposite barrier layer containing cellulose nanofibers (CN) and interfacially polymerized polyamide (PA) matrix, exhibited a 2-times higher flux than that of typical commercial NF membranes (e.g., NF 270 by Dow) for separation of $MgSO_4$ and water (both membranes had the same rejection ratio). There are several advantages in using CN as nanofillers in the nanocomposite barrier layer or directly as a barrier layer for UF applications. These advantages are based on the general characteristics of CN, including nanoscale dimensions (e.g. cross-sectional dimensions from 2-20 nm and length from 200-1000 nm), very high surface to volume ratio, good mechanical properties, good chemical resistance and unique surface functionality. The surface of cellulose nanofibers is hydrophilic and can contain charged groups. This allows the ease of CN dispersion and even the formation of gel (depending on the aspect ratio of CN, concentration, pH value and charge density) in water. In addition, the surface of CN can be functionalized to take part in the interfacial polymerization process.

In accordance with embodiments described herein, high flux TFC membranes, based on a nanocomposite barrier layer containing cellulose nanofibers (CN) and a polyamide matrix supported by an ultrafiltration (UF) polysulfone nanofibrous scaffold, have been demonstrated for two reverse osmosis applications, e.g., low pressure desalination of brackish water and high pressure desalination of seawater. Five types of cellulose nanofibers, 2,3-dialdehyde cellulose nanofibers, alkyl diol/alkyl diamine (where alkyl could be methyl, ethyl, propyl, butyl, etc.) functionalized cellulose nanofibers, and hydroxylamine functionalized cellulose nanofibers, having fiber cross-sectional widths of about 5 nm were introduced into the barrier layer of the membrane thru interfacial polymerization. The resulting cellulose nanofiber thin-film composite (CN-TFC) membranes exhibited higher permeation flux while being able to maintain high salt rejection capability. In certain embodiments, with the incorporation of cellulose nanofibers, CN-TFC membranes of the present disclosure exhibited up to 2 times higher permeation flux than a pristine TFC membrane for desalination of brackish water, and higher permeation flux than what was observed for commercially available SW30HR, SW30XLE and UTC-82V membranes for desalination of seawater, without sacrificing the salt rejection ratio.

Also provided herein are high flux thin-film nanocomposite reverse osmosis membranes produced by interfacial polymerization on various nanofibrous scaffolds. Two types of cellulose nanofibers were introduced into the barrier layer of the reverse osmosis membrane. The resulting membrane exhibited 2 to 5 times higher permeation flux and similar rejection ratios when compared with commercially available membranes and a reverse osmosis membrane without cellulose nanofibers. The fabrication of cellulose nanofibers can also be commercialized which indicated that the membranes can be readily scaled up for mass production.

Embodiments of the high flux thin-film nanocomposite reverse osmosis membranes described herein provide the following advantages:

(1) Cellulose nanofibers prepared by sodium periodate oxidation or TEMPO-mediated oxidation were fabricated and modified with alkyl diol, alkyl diamine, and hydroxylamine functional molecules, where nanocellulose with carboxylate, aldehyde, hydroxyl, and amino-functional groups were obtained.

(2) Five types of cellulose nanofibers, including carboxylate, aldehyde, hydroxyl, hydroxylamino-, and amino-functionalized nanocelluloses, have been incorporated into the barrier layer of thin-film composite membranes where a porous polysulfone membrane was employed as a nanofibrous scaffold.

(3) Directed water channels could be created between the surface of the cellulose nanofibers and the cross-linked polyamide matrix, where the size of the channels could be adjusted by the length of the alkyl alcohol and alkyl amine attached onto the surface of the cellulose nanofibers.

(4) The reverse osmosis membranes containing cellulose nanofibers exhibited 2-times higher permeation flux and the same rejection ratio against sodium chloride in the treatment of brackish water and seawater, when compared with the commercially available counterparts.

Several embodiments of the disclosure are described below with reference to the following non-limiting Examples. The Examples are intended to be illustrative only and are not intended to limit the scope of the present disclosure. As used herein, "room temperature" refers to a temperature of from about 20° C. to about 30° C. Also, parts and percentages, such as solution percentages, are by weight unless otherwise indicated.

Example 1

The concept of directed water channels based on a CN-based nanocomposite barrier layer applied to the conventional TFC format (i.e., using UF support fabricated by the phase inversion method) are described in these examples. Five types of CN were used: CN—COONa having carboxylate groups, thus with negatively charged surface that could not partake in interfacial polymerization; CN—CHO having aldehyde groups with electrical neutrality that could also not react in the polymerization process; CN—OH with hydroxyl groups which might partially participate in the interfacial polymerization; CN-hydroxylamino-(CN—$NH_2OH$) and CN-amino (CN—$NH_2$) groups, having positively charged surfaces that could partake in interfacial polymerization. The surface properties of these five types of CN were characterized by transmission electron microscopy (TEM), Fourier transform infrared (FTIR) spectroscopy, solid-state $^{13}C$ nuclear magnetic resonance (NMR) spectroscopy, and elemental analysis. The filtration performance of the CN-TFC membranes having different cellulose nanofibers and commercially available NF/RO membranes was also determined by using simulated brackish water (low pressure) and seawater (high pressure) solutions.

Example 2

Samples of wood pulps (cellulose Biofloc 92 MV) were obtained from the Tembec Tartas factory in France. Sodium periodate ($NaIO_4$), glycol, hydroxylamine hydrochloride ($NH_3OH$ salt), epichlorohydrin, sodium hypochlorite (NaClO) solution with 13% chlorine, N-hydroxysuccinimide (NETS), N-(3-dimethylaminopropyl)-N'-ethylcarbodiimide hydrochloride (EDC), 2,2,6,6-tetramethyl-1-piperidinyloxy (TEMPO, 98%), sodium bromide (NaBr), sodium hydroxide (NaOH), m-phenylenediamine (MPD), trimesoyl chloride (TMC), and n-hexane were purchased from Sigma-Aldrich. All chemicals were used as received without further purification. A porous polysulfone ultrafiltration (UF) membrane support (PS35), prepared by the phase inversion method, was purchased from Sepro Membranes, Inc.

Example 3

2,3-dialdehyde cellulose nanofibers (CN—CHO) were prepared as follows. Briefly, 2.0 grams of dry wood pulp and cellulose sodium periodate (1.0 gram) was dispersed in water (300 grams). The mixture was stirred for 48 hours at room temperature while covered with aluminum foil to avoid light. The reaction was terminated by adding glycol (5.0 mL) followed by stirring for another 10 minutes. The oxidized cellulose product was separated using centrifugation at 5000 rpm, and was subsequently washed with deionized (DI) water. This process was repeated for several times until the conductivity value was lower than 50 mS. The oxidized cellulose slurry was dispersed in 100 grams of water followed by defibrillation for 10 minutes using a homogenizer.

Example 4

Carboxylated cellulose nanofibers (CN—COONa) were prepared according to the following protocol. In brief, 2.2 grams of dry wood pulp cellulose was first dispersed in water (192 grams). Sodium bromide (0.2 grams) and TEMPO agent (0.04 grams) were dissolved in the suspension. The reaction was initiated by adding 30.0 grams of NaClO aqueous solution. The mixture was stirred for 24 hours at room temperature with the pH value maintained between 10.0 and 10.3 (adjusted by using 0.5 mol/L sodium hydroxide aqueous solution). The reaction was terminated by adding ethanol (10 mL) followed by stirring for another 10 minutes. The oxidized cellulose product was separated using centrifugation at 5000 rpm, and was subsequently washed with deionized (DI) water. This process was repeated for several times until the pH value reached around 7.0. The oxidized cellulose slurry was dispersed in 100 grams of water followed by defibrillation for 5 minutes using a sonicator (Cole Parmer, VCX-400, output power of 320 W). The final concentration of carboxylated cellulose nanofibers (CN—COONa) in suspension was determined using a total organic carbon analyzer (TOC-500, Shimadzu Corporation).

Example 5

The CN—CHO nanofibers from Example 3 were further modified to prepare alkyl alcohol-functionalized CN (CN—OH) nanofibers, where alkyl could be methyl, ethyl, propyl, butyl, etc. As an example, 10 equivalents of glycol was first added slowly to 0.5 weight % of CN—CH suspension followed by continuously stirring at room temperature for another 24 hours. The resulting suspension was subsequently dialyzed using DI water until the conductivity remained unchanged. The final suspension was further sonicated for 10 minutes.

Example 6

The CN—CHO nanofibers from Example 3 were also modified to prepare alkylamino-functionalized CN (CN—NH$_2$) nanofibers, following a similar procedure as in Example 5. The resulting suspension was subsequently dialyzed using DI water until the conductivity remained unchanged. The final suspension was further sonicated for 10 minutes.

Example 7

The carboxylated CN—COONa nanofibers from Example 4 were further modified to prepare hydroxyamino-functionalized CN (CN—NH$_2$OH) nanofibers. In brief, 52 grams of oxidized cellulose slurry (2.0 weight %) was diluted with 120 grams of water. About 1.1 grams of epichlorohydrin was added to the suspension followed by another 30 mL of NaOH aqueous solution (20 weight %). The reaction system was stirred at room temperature for 18 hours. The resulting suspension was subsequently centrifuged and washed using DI water until the conductivity remained unchanged.

The final suspension was epoxy-grafted cellulose slurry, which was further modified with hydroxylamine. About 10.0 grams of epoxy grafted cellulose slurry (~5.0 weight %) was mixed with 50 mL of water and 5 grams of ammonium hydroxide (28-30%), while tuning the pH value to 12.0 with a sodium hydroxide aqueous solution. The reaction system was stirred at 60° C. for 24 hours. The final hydroxylamine-grafted cellulose slurry was washed with DI water several times until the pH value of the suspension was around 7.0. The hydroxyamino-functionalized CN (CN—NH$_2$) suspension was prepared by further homogenizing for 5 minutes.

Example 8

CN-TFC membranes were prepared by interfacial polymerization on top of a polysulfone ultrafiltration (UF) substrate (PS35). The procedures were as follows. The reactive aqueous phase was prepared by first dissolving a proper amount of MPD in DI water and then by adding (functionalized) cellulose nanofibers to form a homogenous suspension. The reactive organic phase was prepared by dissolving a proper amount of TMC in n-hexane. The PS35 substrate was then immersed in a 2.0 weight % of MPD aqueous solution without CN for 2 minutes, followed by squeezing it with a rubber roller to remove the excess MPD solution. Subsequently, the aqueous suspension, containing 2.0 weight % MPD and cellulose nanofibers (CN), i.e., CN—COONa, CN—NH$_2$OH, CN—OH, CN—CHO, or CN—NH$_2$, with varying concentrations from 0.02 to 0.2 weight %, was introduced on the UF substrate surface by cast-coating. The cast suspension was allowed to equilibrate for another 30 minutes before removing the excess amount. Then, 0.1 weight % TMC/n-hexane solution was coated on top of the saturated PS35 UF support and the reaction was allowed to take place for 2 minutes. The excess organic solution was subsequently drained and the resulting membrane was cured in an oven at 70° C. for 10 minutes. Finally, the membrane was washed with DI water and stored in a refrigerator for further use. A TFC membrane, prepared by interfacial polymerization using MPD aqueous solution without cellulose nanofibers, was also used as a control.

Example 9

For CN—COONa, the amount of carboxylate groups was determined by using a conductometric titration method. In brief, 100 mL of 0.05 weight % of CN—COONa suspension was used, where the pH value was adjusted between 2.0 and 3.0 using a hydrochloric acid aqueous solution (0.1 mol/L). Then, a NaOH standard solution (0.05 mol/L) was used to titrate the suspension until the pH value reached 11.0. The amount of carboxylate groups in CN—COONa was determined by the consumption of NaOH solution, which was about 1.0 mmol/(g cellulose nanofiber).

Example 10

FTIR with attenuated total reflectance (ATR) accessory (Nicolet IS10 spectrophotometer, Thermo Scientific, Inc.) was used to determine the chemical structure of five functionalized cellulose nanofibers. Freeze-dried samples were used, whereas the ATR spectra were collected in the wavenumber range of 550 and 4000 cm$^{-1}$.

Example 11

TEM images of CN samples were obtained by an instrument (FEI Bio TwinG2) operated at an accelerating voltage of 120 kV. The samples were prepared by the deposition of a 0.05 weight % CN—COONa or CN—NH$_2$OH suspension on the TEM grids (commercially available from Ted Pella), followed by staining using an uranyl acetate aqueous solution (1.6 weight %).

Example 12

The $^{13}$C NMR spectra of CN samples were recorded on a Bruker Avance 500 spectrometer equipped with a 4 mm CP-MAS probe, operated at a proton frequency of 500.03 MHz. The samples were spun at 12 kHz to minimize spinning sidebands. The data were acquired using a variable amplitude cross-polarization sequence with a 1 ins ramped amplitude pulse on the proton channel, and a SPLNAL64 decoupling scheme. Each sample was conducted for 256 or 512 scans, while the free induction decay was Fourier transformed. The phase correction was carried out by a shifted sine-bell squared weighting function.

Example 13

Scanning electron microscopic (SEM) measurements were carried out to investigate CN-TFC membranes. SEM was used to observe the surface morphology of the membranes. These images were collected using a LEO 1550 microscope equipped with a Schottky field emission gun (20 kV) and a Robinson backscatter detector. All samples were gold-coated with a sputter (SC7620 Sputter Coater, Quorum Technologies) with the current of 16 mA for 20 seconds.

Example 14

The thermal gravimetric analysis (TGA, model TGA 7 from Perkin-Elmer Inc.) scans of freeze-drying samples were collected at 10° C./minute from 60° C. to 800° C. under an air flow.

Example 15

Wide-angle X-ray diffraction (WAXD) experiments of modified cellulose nanofibers were carried out at the X27C beam line in the National Synchrotron Light Source (NSLS), Brookhaven National Laboratory (BNL). The wavelength used was 0.1371 nm. The sample-to-detector distance for WAXD was 108.3 mm. A two-dimensional MAR-CCD (MAR, Inc.) X-ray detector was used for the data collection.

Example 16

Two custom-built cross-flow filtration systems, e.g., a low pressure nanofiltration (NF) system (up to 150 psi) and a high pressure reverse osmosis (RO) system (up to 1000 psi) with an active filtration area of 42 cm$^2$ was used to evaluate the RO performance. The filtration measurements were carried out under two different conditions.

The first set of conditions included a low-pressure operation to evaluate the desalination of brackish water. In this study, 2000 ppm of NaCl solution was used as the feed solution, the operating pressure was 150 psi, and the flow rate of the feed solution was 0.1 gallon per minute (GPM).

The second set of conditions included a high-pressure operation to evaluate the desalination of seawater. In this study, 35,000 ppm of NaCl aqueous solution was used as the feed solution, the operating pressure was 800 psi, and the flow rate of the feed solution was 0.5 GPM. The temperature of the feed solution was fixed at 25° C. using a recirculating chiller (Thermoflex 1400).

All membranes were compacted for 2-3 hours under the test conditions prior to recording the data (i.e., the permeation flux and salt rejection ratio). Salt rejection ratio and permeate flux were calculated using the following equations (i) and (ii):

$$R = \left(1 - \frac{C_p}{C_f}\right) \times 100\% \quad \text{(i)}$$

$$J = \frac{\Delta v}{\Delta t} \times A \quad \text{(ii)}$$

Where $C_p$ and $C_f$ are the conductivities of the permeate solution and the feed solution, respectively, J is the permeation flux, $\Delta v$ is the permeate volume collected in a period of time $\Delta t$, and A is the effective membrane area.

Example 17

Aldehyde-functionalized cellulose nanofibers (CN—CHO), alkyl alcohol-functionalized cellulose nanofibers, and alkylamino-functionalized cellulose nanofibers were prepared by oxidation of cellulose with sodium periodate, followed by grafting of alkyl diol or alkyl diamine (where alkyl is methyl, ethyl, propyl, butyl, etc.) onto the surface of 2,3-dialdehyde cellulose nanofibers (CN—CHO) in an aqueous media (the reactions are illustrated in FIG. 1). The grafting reaction was carried out at room temperature. In this reaction, an excess amount of alkyl diol and alkyl diamine was used to avoid the side reaction of cross-linking between cellulose nanofibers and diol/diamine molecules. In addition, diol/diamine was added slowly into the suspension under vigorous stirring to avoid being partially concentrated, where the reaction would occur heterogeneously. The excess amount of diol/diamine was removed by dialysis using DI water, which was realized when the conductivity of the suspension became unchanged. The concentration of all cellulose nanofibers (CN—CHO, CN—OH, and CN—NH$_2$) was determined by the total organic carbon (TOC) analysis, where the amount of CN was calculated by using the weight of the suspension and the CN concentration.

Example 18

Figure 2:
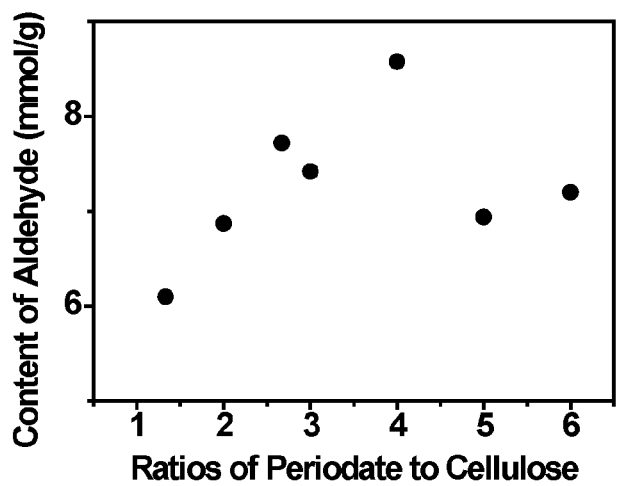
FIG. 2 is a graph showing the content of aldehyde at varying ratios of periodate to cellulose for fibers prepared in accordance with the present disclosure.

2,3-dialdehyde cellulose nanofibers (CN—CHO) with different oxidation degrees were prepared by changing the ratio of sodium periodate to cellulose, as shown in FIG. 2. It was found that the optimized molar ratio between sodium periodate and cellulose was 4:1, based on the experiments, while the content of aldehyde groups or the oxidation degree was 8.58 mmol/g cellulose.

Example 19

Figure 3:
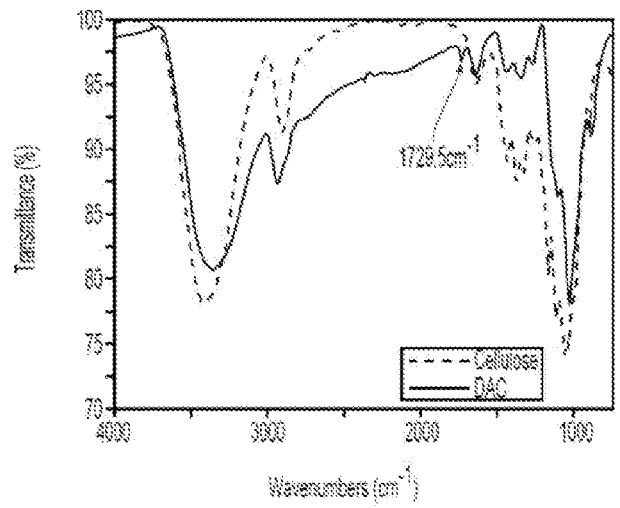
FIG. 3 are Fourier-transform infrared (FTIR) spectra of wood pulps and 2,3-dialdehyde cellulose nanofibers (CN—CHO)

Wood pulp and 2,3-dialdehyde cellulose nanofibers (CN—CHO) were prepared for FTIR measurements, where the corresponding spectra are illustrated in FIG. 3.

In FIG. 3, the FTIR spectrum of 2,3-dialdehyde cellulose nanofibers (CN—CHO) exhibits a peak at 1729.5 cm$^{-1}$, corresponding to the C=O stretching vibration of the aldehyde group, which indicated the success of oxidation of cellulose by sodium periodate. Therefore, C2 and C3 hydroxyl groups in cellulose were converted partially to the aldehyde groups, as depicted in the reaction scheme shown in FIG. 1.

Example 20

Figure 4:
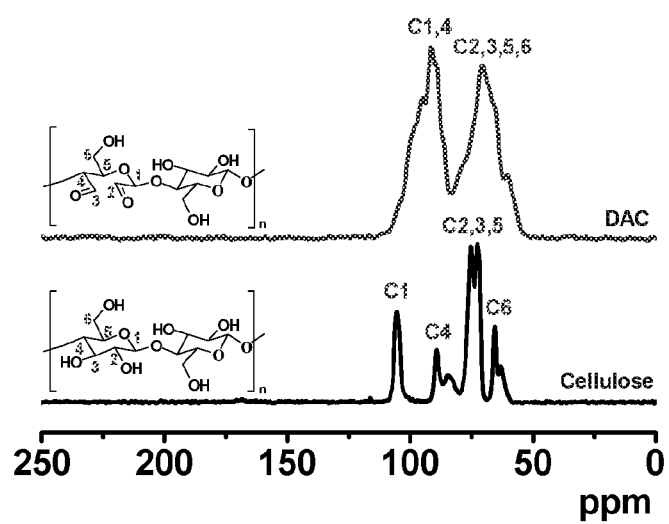
FIG. 4 includes $^{13}$C cross-polarization magic angle spinning (CP-MAS) nuclear magnetic resonance (NMR) spectra of wood pulps and 2,3-dialdehyde cellulose nanofibers.

The chemical structure of both wood pulps (cellulose) and 2,3-dialdehyde cellulose (DAC) nanofibers were further characterized by solid-state CP-MAS $^{13}$C NMR, where the results are shown in FIG. 4.

The chemical shifts of C1-C6 carbon in cellulose were changed drastically after oxidation of periodate, as shown in FIG. 4, C1 and C4 as well as C2, C3, C5, and C6 are merged together which implied the loss of crystallinity by oxidation. Meanwhile, the signal of carbonyl groups expected at 175-180 ppm could not be seen possibly due to the formation of hemiacetals in 2,3-dialdehyde cellulose nanofibers.

Example 21

Hydroxylamino-functionalized cellulose nanofibers (CN—NH$_2$OH) were fabricated from carboxylated cellulose nanofibers (CN—COONa) thru two-step-modifications: (1) epichlorohydrin was reacted with hydroxyl groups in cellulose nanofibers first, (2) followed by grafting with hydroxylamine, as shown in FIG. 5. Carboxylate groups co-existed on the surface of modified cellulose nanofibers; therefore, the hydroxylamino-functionalized cellulose nanofibers could be dispersed in water after modification. It was expected that both amino groups and hydroxyl groups participated in the interfacial polymerization when the polyamide barrier layer was created by the reaction of monomers TMC and MPD at the interface between hexane and water.

Example 22

Figure 6:
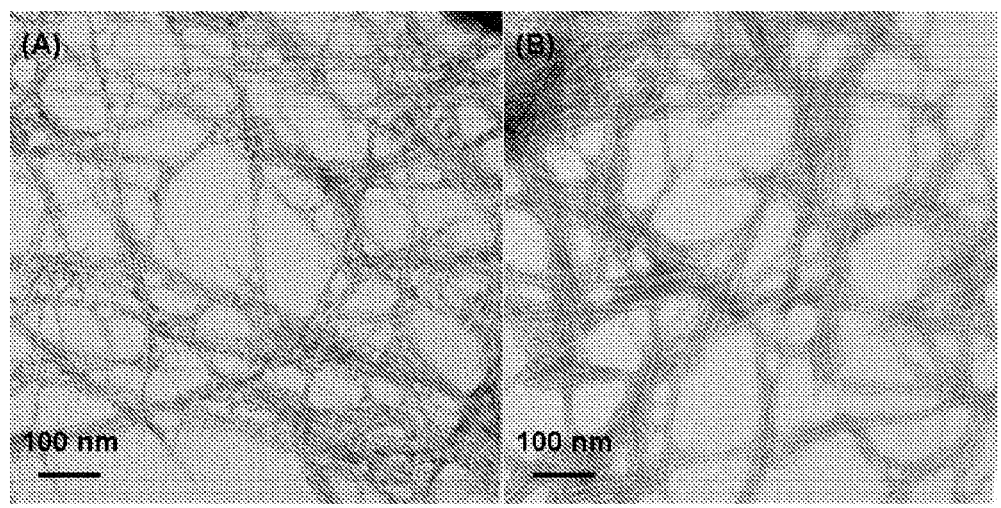
FIGS. 6A-6B include transmission electron microscopy (TEM) images of carboxylated cellulose nanofibers (CN—COONa) (FIG. 6A), and hydroxylamino-functionalized cellulose nanofibers (CN—NH$_2$OH) (FIG. 6B)

The dimensions of CN—COONa and CN—NH$_2$OH nanofibers were estimated by the TEM measurement, where the typical TEM images are shown in FIG. 6.

Based on these images, the average cross-sectional dimension (or the average width if we consider CN has a ribbon shape) of both the CN—COONa and CN—NH$_2$OH samples was from about 5 nm to about 10 nm, while the fiber length was from about 500 nm to about 1000 nm. It was seen that the dimensions of the cellulose nanofibers were not altered by the hydroxylamino grafting reaction.

Example 23

The thermal stability of epoxy- and hydroxylamino-functionalized cellulose nanofibers was investigated with a TGA instrument. The scanned curves, along with the differential curves, are shown in FIGS. 7A and 7B.

As can be seen in FIGS. 7A and 7B, the nanofibers exhibited good thermal stability up to 230° C. and completely decomposed at 270° C. in air. There is negligible difference between the epoxy- and hydroxylamino-functionalized cellulose nanofibers with respect to thermal stability.

Example 24

Wide angle X-ray diffraction (WAXD) was employed to determine the crystallization of hydroxylamino- and epoxy- functionalized cellulose nanofibers. The 2-dimensional profiles are shown in FIG. 8. It was very clear that the cellulose I crystal structure remained after modifications by epoxy-grafting or hydroxylamino-grafting, indicating that the surface grafting modification does not change the crystal structure of cellulose nanofibers, where the native cellulose crystal structure was retained.

Example 25

Reverse osmosis (RO) membranes were fabricated by using interfacial polymerization between TMC and MPD to produce a barrier layer. To create a nanocomposite barrier layer format, different type of CN—COONa, CN—NH$_2$OH, CN—OH, CN—CHO, and CN—NH$_2$ nanofibers were incorporated during the interfacial polymerization reaction to introduce interconnected water channels through the fiber CN and polymer matrix interface. Without wishing to be bound by any theory, it is believed that CN—COONa may be able to take part in the interfacial polymerization process. The morphology of the resulting polyamide barrier layers containing CN—COONa was examined by SEM, where representative cross-sectional images of a pristine TFC membrane and a TFC membrane containing CN—COONa on an electrospun nanofibrous scaffold are shown in FIGS. 9A and 9B, respectively. It was found that all membranes exhibited a ridge structure, frequently observed in thin-film composite RO membranes. The barrier layer thicknesses of these membranes were from about 100 nm to about 200 nm. It was interesting to note that the barrier layer on the electrospun nanofibrous scaffold exhibited a more crumpled surface due to the diffusion difference between the electrospun nanofiber and the commercially available membrane substrates.

Example 26

The filtration efficiency of CN-TFC membranes was evaluated by using feed solutions of different salt concentrations and at different operating pressures, where these conditions corresponded to desalination of brackish water and seawater, respectively. The filtration efficiency was evaluated based on an A value and B value, which reflected the permeation flux of pure water and salt through the RO membrane, respectively, and were calculated by the following equations (iii) and (iv):

$$A = \frac{J_w}{\Delta P - \Delta \pi} \quad \text{(iii)}$$

$$B = \frac{(1-R) \times A \times (\Delta P - \Delta \pi)}{R} \quad \text{(iv)}$$

Where $J_w$ is pure water flux (L/m$^2$ h), ΔP is the transmembrane pressure (bar), Δπ is the osmosis pressure (bar), and R is the rejection ratio.

Example 27

The effect of the barrier layers, with and without CN—COONa, on the filtration performance of CN-TFC membranes was examined. The desalination of simulated brackish water was first evaluated, where membranes were tested under the condition of 150 psi pressure and room temperature using a 2000 ppm NaCl feed solution. The combined plots of permeation flux and salt rejection ratio as a function of the loading cellulose nanofiber content for two different CN-TFC membranes are shown in FIG. 10.

It was very clear that the incorporation of CN—COONa cellulose nanofibers could increase the water permeability, possibly due to the formation of directed water channels in the barrier layer, which serves as the pathway for water molecule transportation. Meanwhile, the B value increased with the increase of CN—COONa cellulose nanofibers, which could be due to the increasing passage of salt ions through the membrane. Moreover, a high concentration of CN—COONa, such as 2.0 weight %, led to the decrease in A value of the membrane, which could be because of the heterogeneous composition of CN—COONa nanofibers in the barrier layer. The optimized concentration of CN—COONa nanofibers, based on these experiments, was 0.1 weight %, while the corresponding CN-TFC membrane exhibited 2-times higher permeation flux than that of a pristine TFC membrane with a similar rejection ratio.

Example 28

By changing the concentration of monomers, reaction time, and load of CN—COONa nanofibers, different TFC-membranes were fabricated and the desalination performance was evaluated using a low pressure (150 psi) filtration system. The results are summarized below in Table 1.

TABLE 1

Filtration performance of CN-TFC membranes as well as commercially available RO membranes

| Substrate | TMC (w/v %) | MPD (w/v %) | CN (weight %) | A (L/m²h/bar) | B (L/m²h) | Time (s) |
|---|---|---|---|---|---|---|
| PS35 | 0.1 | 1.0 | — | 0.54 | 0.15 | 30 |
| PS35 | 0.1 | 2.0 | — | 1.22 | 0.18 | 20 |
| PS35 | 0.1 | 2.0 | 0.02 | 1.45 | 0.21 | 20 |
| PS35 | 0.1 | 2.0 | 0.05 | 1.93 | 0.26 | 20 |
| PS35 | 0.1 | 2.0 | 0.10 | 2.23 | 0.52 | 20 |
| PS35 | 0.1 | 2.0 | 0.20 | 1.27 | 0.37 | 20 |
| PS35 | 0.1 | 2.0 | — | 2.17 | 0.33 | 10 |
| BW30 | — | — | — | 4.03 | 1.52 | — |
| XLE | — | — | — | 7.59 | 7.09 | — |
| LE | — | — | — | 8.76 | 6.70 | — |

PS35 = Membrane of the present disclosure
BW30 = RO membrane for brackish water desalination (Dow)
XLE = low pressure RO membrane (Dow)
LE = low pressure RO membrane (Dow)

It was observed that the increase in reaction time from 10 to 30 seconds led to the decrease in A value (pure water flux) from 2.17 to 0.54 L/m² h/bar, which could be attributed to the increase in thickness of the membrane barrier layer. The incorporation of CN—COONa nanofibers increased the permeation flux as discussed before. Comparing to the commercially available membranes such as BW30, XLE, and LE, which are marketed for use for brackish water desalination, the CN-TFC membranes of the present disclosure exhibited high rejection ratio and a reasonably high permeation flux.

Example 29

The effect of the filtration performance of TFC membranes was also evaluated for desalination of simulated seawater, where 35,000 ppm (or 35 g/L) NaCl solution was used as the feeding solution and operating pressure was fixed at 800 psi. The TFC membrane was prepared by using 0.1 w/v % of TMC in hexane and 2.0 w/v % of MPD in water as organic phase and aqueous phase, respectively, with PS35 ultrafiltration membrane (Sepro) as the substrate. The reaction time was controlled at 2 minutes. The results for the TFC membrane, as well as for commercially available SW30XLE, SW30HR, UTC-82V membranes, are shown below in Table 2. It was seen that under the chosen reverse osmosis operating conditions, the Dow SW30HR membrane showed flux of 14.7 L/m² h and NaCl rejection of 99.5%. The permeation flux of the PA-PS35 membrane of the present disclosure was 17.6 L/m² h, which was higher than that of the Dow SW30HR membrane, while remaining the same rejection ratio of 99.5%. Meanwhile, the rejection ratio of the PA-PS35 membrane of the present disclosure was higher than that of the SW30XLE and UTC-82V membranes under the same operating conditions. In summary, the TFC-membrane of the present disclosure could be used at high operating pressure and exhibited comparable or better permeation flux and rejection ratios when compared with commercially available RO membranes.

TABLE 2

Filtration performance of TFC membrane PA-PS35 as well as commercially available SW30XLE, SW30HR, and UTC-82V RO membranes at 800 psi/25 ± 1° C. to simulate the desalination of seawater

| Membrane | Flux (L/m²h) | Rejection (%) | A (L/m²h/bar) | B (L/m²h) |
|---|---|---|---|---|
| SW30XLE* | 17.6 | 99.4 | 1.68 | 0.010 |
| SW30HR* | 14.7 | 99.5 | 1.28 | 0.006 |
| UTC-82V** | 25.8 | 99.2 | 3.00 | 0.024 |
| PA-PS35*** | 16.7 | 99.5 | 2.79 | 0.006 |

*Dow Filmtec RO membrane;
**Toray RO membrane;
***Membrane of the present disclosure.

Although measurements were not obtained for the CN-TFC membrane containing CN—COONa for the high pressure filtration test to simulate seawater desalination, it is expected the results would be better than those of the membrane without CN, based on the low pressure brackish water desalination study, where 2-times better permeation flux was achieved. While not wishing to be bound by any theory, the grafting of alkyl amino-groups onto the surface of carboxylated cellulose nanofibers may (1) allow the amine group to participate in the interfacial polymerization reaction, and (2) increase the gap width in the directed water channel by changing the length of alkyl group.

Figure 11:
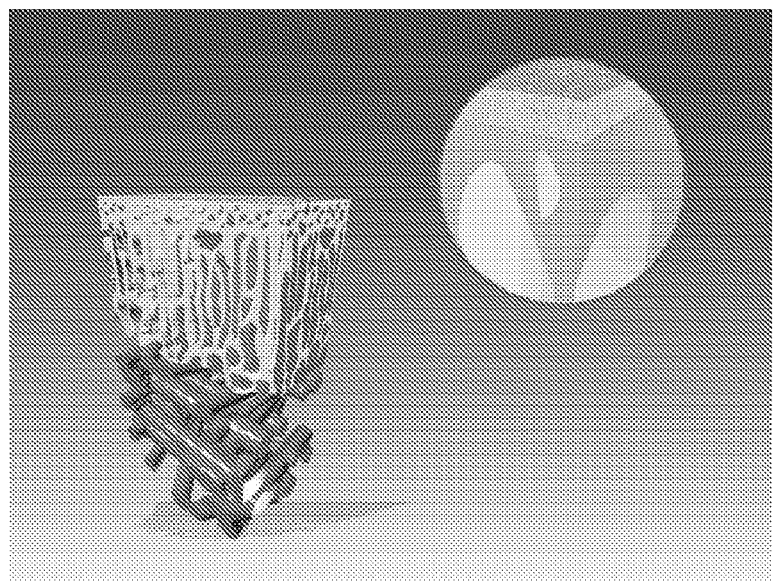
FIG. 11 is a schematic diagram showing directed water channels in the barrier layer of a TFC membrane of the present disclosure.

Compared to a TFC-membrane without the incorporation of cellulose nanofibers, the CN-TFC membrane of the present disclosure exhibited 2-times higher permeation flux and a similar rejection ratio in low pressure (for brackish water desalination). Meanwhile, the TFC membrane could be applied in seawater desalination (at high pressure), and a comparable/better permeation flux and rejection ratio was achieved compared with commercially available desalination membranes, such as SW30 XLE and SW30HR from Dow, and UTC-82V from Toray. These results support the concept of directed water channels incorporated in the barrier layer, where the channels are formed between the surface of the cellulose nanofibers and the cross-linked polyamide matrix. The schematic diagram of directed water channels in the barrier layer of a TFC membrane, in accordance with the present disclosure, is shown in FIG. 11. In this diagram, the bottom layer is a non-woven PET substrate, the middle layer is a polysulfone porous layer prepared by the phase inversion method, the top layer is a polyamide nanocomposite barrier layer containing a connected scaffold of cellulose nanofibers (the insert image shows the enlarged structure of the barrier layer). These interconnected water channels in the barrier layer could significantly shorten the water passage distance, thus increasing the permeation flux without sacrificing the rejection ratio of the membrane.

It will be understood that various modifications may be made to the embodiments disclosed herein. Therefore, the above description should not be construed as limiting, but merely as an exemplification of preferred embodiments. Those skilled in the art will envision other modifications within the scope and spirit of the present disclosure. Such modifications and variations are intended to come within the scope of the following claims.

What is claimed is:

1. An article comprising:

a nanofibrous scaffold having pores of a diameter from about 0.01 μm to about 10 μm; and a barrier layer on at least a portion of a surface of said nanofibrous scaffold, the barrier layer including a polymer matrix in combination with functionalized cellulose nanofibers, wherein the functionalized cellulose nanofibers have amine functionality as part of at least one of the following structures:

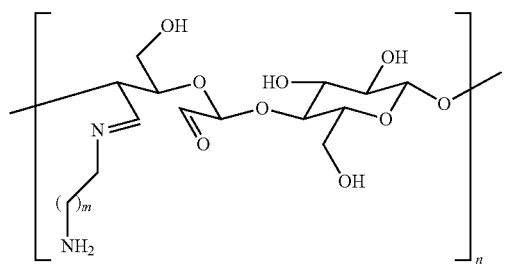

m = 0, 1, 2, 3, 4, ...

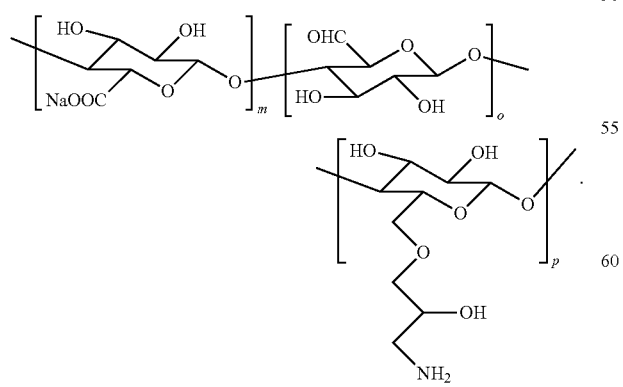

2. The article of claim 1, wherein the nanofibrous scaffold comprises a polymer selected from polysulfones, polyolefins, fluoropolymers, polyesters, polyamides, polycarbonates, polystyrenes, polynitriles, polyacrylates, polyacetates, polyalcohols, polysaccharides, proteins, polyalkylene oxides, polyurethanes, polyureas, polyimines, polyacrylic acids, polymethacrylic acids, polysiloxanes, poly(ester-co-glycol) copolymers, or poly(ether-co-amide) copolymers.

3. The article of claim 1, wherein the nanofibrous scaffold has a thickness of from about 1 μm to about 500 μm.

4. The article of claim 1, wherein the polymer matrix is a polyamide, cellulose acetate, cellulose triacetate, or polyether-b-polyamide, and wherein the barrier layer has a thickness from about 5 nm to about 500 nm.

5. The article of claim 1, wherein the functionalized cellulose nanofiber is present in the barrier layer in amounts from about 0.01% by weight to about 50% by weight of the barrier layer.

6. The article of claim 1, further comprising a substrate, wherein the nanofibrous scaffold is applied to at least a portion of the substrate.

7. The article of claim 6, wherein the substrate comprises a polymer selected from the group consisting of polysulfones, polyolefins, polyesters, polyamides, polyurethanes, polyureas, fluorinated polymers, derivatives thereof and copolymers thereof.

8. The article of claim 6, wherein the substrate is selected from the group consisting of cellulose acetates, fluoropolymers, polyamides, polyimides, and combinations thereof, and wherein the substrate has a pore size of from about 5 nm to about 500 nm.

9. A method for conducting reverse osmosis, the method including contacting water with the article of claim 1, and recovering the water after filtering the water through the article of claim 1.

10. An article comprising:

a substrate;

a nanofibrous scaffold having pores of a diameter from about 0.01 μm to about 10 μm; and a barrier layer on at least a portion of a surface of said nanofibrous scaffold, the barrier layer including a polymer matrix in combination with functionalized cellulose nanofibers, wherein the functionalized cellulose nanofibers have amine functionality as part of at least one of the following structures:

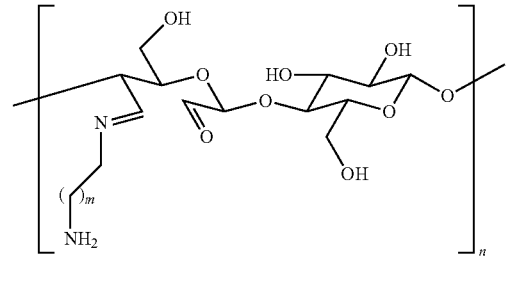

m = 0, 1, 2, 3, 4, ...

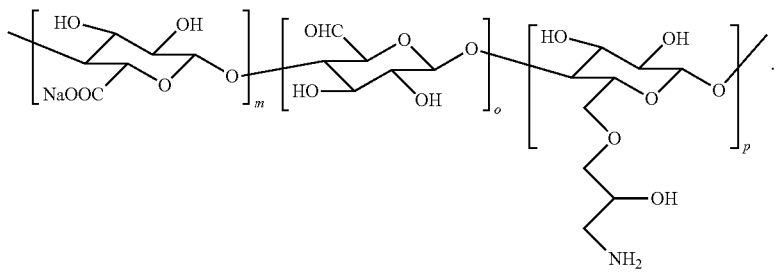

11. The article of claim 10, wherein the substrate comprises a polymer selected from the group consisting of polyolefins, polyesters, polyamides, polyurethanes, polyureas, fluorinated polymers, derivatives thereof and copolymers thereof.

12. The article of claim 10, wherein the substrate has a pore size of from about 5 nm to about 500 nm.

13. The article of claim 10, wherein the nanofibrous scaffold comprises a polymer selected from polysulfones, polyolefins, fluoropolymers, polyesters, polyamides, polycarbonates, polystyrenes, polynitriles, polyacrylates, polyacetates, polyalcohols, polysaccharides, proteins, polyalkylene oxides, polyurethanes, polyureas, polyimines, polyacrylic acids, polymethacrylic acids, polysiloxanes, poly(ester-co-glycol) copolymers, or poly(ether-co-amide) copolymers.

14. The article of claim 10, wherein the nanofibrous scaffold has a thickness of from about 1 μm to about 500 μm.

15. The article of claim 10, wherein the polymer matrix is a polyamide, cellulose acetate, cellulose triacetate, or polyether-b-polyamide, and wherein the barrier layer has a thickness from about 5 nm to about 500 nm.

16. The article of claim 10, wherein the functionalized cellulose nanofiber is present in the barrier layer in amounts from about 0.01% by weight to about 50% by weight of the barrier layer.

17. A method for conducting reverse osmosis, the method including contacting water with the article of claim 10, and recovering the water after filtering the water through the article of claim 10.

* * * * *